(12) United States Patent
Nishii et al.

(10) Patent No.: US 10,640,149 B2
(45) Date of Patent: May 5, 2020

(54) APRON UPPER MEMBER OF VEHICLE

(71) Applicant: TOYOTA JIDOSHA KABUSHIKI KAISHA, Toyota-shi, Aichi-ken (JP)

(72) Inventors: Ryosuke Nishii, Toyota (JP); Shota Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 16/205,803

(22) Filed: Nov. 30, 2018

(65) Prior Publication Data

US 2019/0176898 A1    Jun. 13, 2019

(30) Foreign Application Priority Data

Dec. 13, 2017  (JP) ................ 2017-238939

(51) Int. Cl.
*B62D 25/08*  (2006.01)
*B62D 21/15*  (2006.01)

(52) U.S. Cl.
CPC ......... *B62D 25/085* (2013.01); *B62D 21/152* (2013.01); *B62D 25/08* (2013.01)

(58) Field of Classification Search
CPC ..... B62D 25/085; B62D 21/152; B62D 25/08
USPC ............... 296/187.09, 187.1, 193.09, 203.02
See application file for complete search history.

(56) References Cited

U.S. PATENT DOCUMENTS

| 5,324,133 A * | 6/1994 | Kreis | B62D 21/152 228/119 |
|---|---|---|---|
| 2003/0168886 A1* | 9/2003 | Ozawa | B60R 19/34 296/187.09 |
| 2007/0215402 A1* | 9/2007 | Sasaki | B62D 21/152 180/232 |
| 2016/0121934 A1* | 5/2016 | Murayama | B62D 21/152 296/187.09 |

FOREIGN PATENT DOCUMENTS

JP    H10-53159 A    2/1998

* cited by examiner

*Primary Examiner* — Joseph D. Pape
(74) *Attorney, Agent, or Firm* — Oliff PLC

(57) ABSTRACT

An apron upper member of a vehicle extends from a front pillar to a front side of the vehicle, and includes: a rear half portion having a sheet metal structure and having a vehicle rear end connected to the front pillar; and a front half portion formed of a casting product, the front half portion being connected to the rear half portion, extending to the front side of the vehicle, and having a vehicle front end connected to a crash box. The front half portion has a strength lowering portion immediately ahead of a connecting portion connected to the rear half portion. This suppresses significant approach of an occupant to a vehicle body at the time of collision.

4 Claims, 7 Drawing Sheets

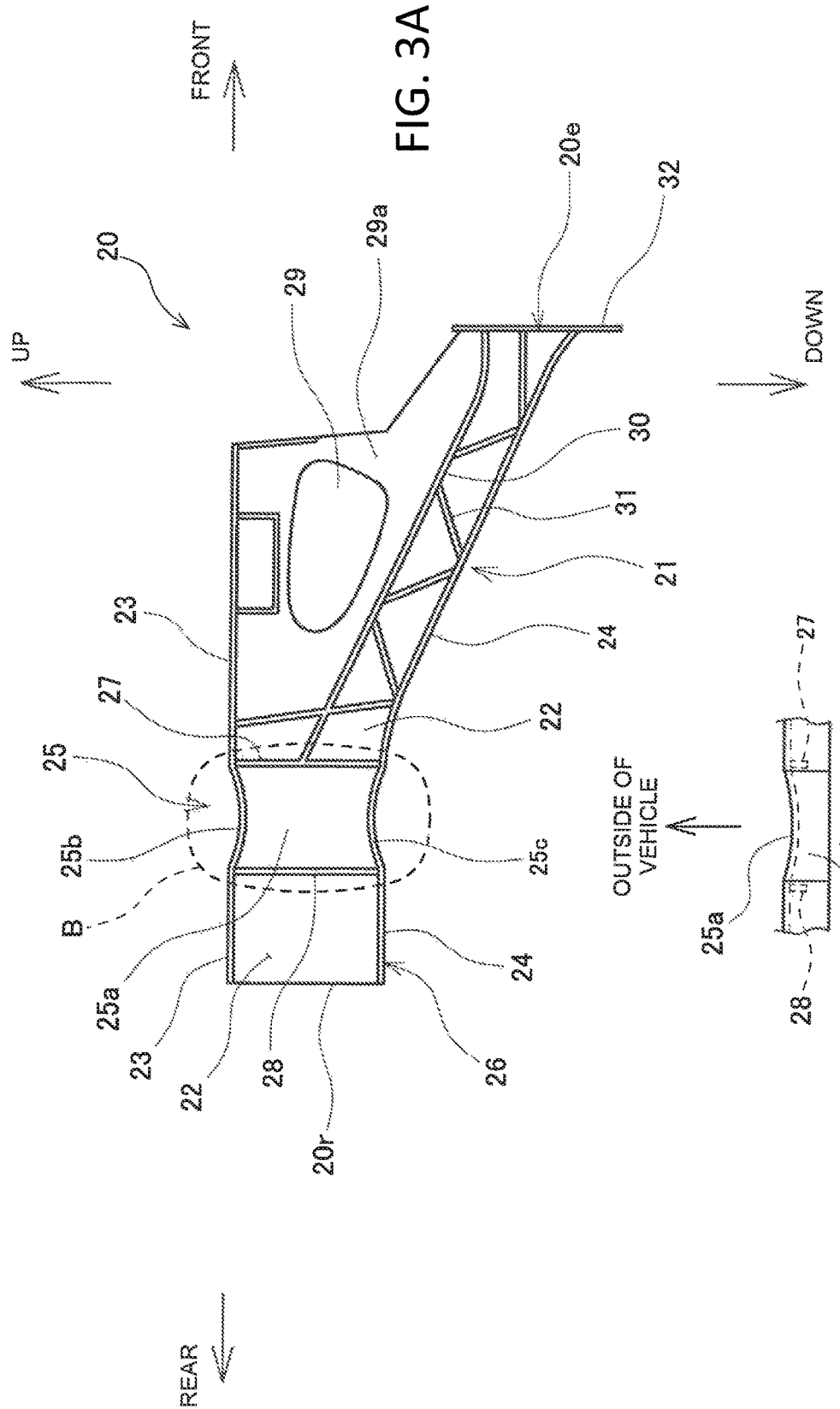
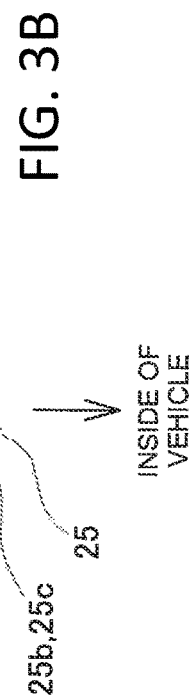

APRON UPPER MEMBER OF VEHICLE

CROSS REFERENCE TO RELATED APPLICATION

This application claims priority to Japanese Patent Application No. 2017-238939 filed on Dec. 13, 2017, which is incorporated herein by reference in its entirety including the specification, claims, drawings, and abstract.

TECHNICAL FIELD

The present disclosure relates to a structure of an apron upper member extending from a front pillar of a vehicle to a front side of the vehicle.

BACKGROUND

Aprons each formed integrally with a wheel housing and a suspension tower are disposed on both sides of an engine compartment disposed at a front of a vehicle in a vehicle width direction. On an upper side of each of the aprons, there is disposed an apron upper member having a rear end joined to a front pillar and extending to a front side of the vehicle to reinforce each of the aprons. The apron upper member needs to secure rigidity and simultaneously needs to absorb an impact force when a collision load is input by front collision of a vehicle or the like. For this reason, there has been proposed a structure in which a bead and a bulging portion are disposed on an apron upper member such that the apron upper member can be smoothly buckled when a collision load is input (for example, see JP H10-53159 A).

SUMMARY

In the apron upper member described in JP H10-53159 A, when a collision load is input, a plurality of beads or bulging portions sequentially serve as starting points of buckling, and buckling continuously occurs while the collision load is input. For this reason, buckling occurs with a relatively small collision load, and the buckling occurs continuously. In this manner, when buckling occurs with a relatively small collision load, decelerating acceleration in an initial stage of collision is small, time elapses before restraint with a seat belt, and an occupant may move forward to approach a vehicle body. In addition, since buckling occurs continuously, decelerating acceleration is continuously applied to an occupant, and the occupant continuously approaches the vehicle body. For this reason, in particular, when collision occurs at a high speed, an occupant significantly approaches the vehicle body, which is disadvantageous.

Therefore, an object of the present disclosure is to suppress significant approach of an occupant to a vehicle body at the time of collision.

Solution to Problem

A front upper member of a vehicle according to an embodiment of the present disclosure is an apron upper member of a vehicle extending from a front pillar to a front side of the vehicle, including: a rear half portion having a sheet metal structure and having a vehicle rear end connected to the front pillar; and a front half portion formed of a casting product, the front half portion being connected to the rear half portion, extending to the front side of the vehicle, and having a vehicle front end connected to a crash box which undergoes compressive plastic deformation in a vehicle front-rear direction at the time of front collision of the vehicle, in which the front half portion has a strength lowering portion immediately ahead of a connecting portion connected to the rear half portion.

In this manner, the front half portion formed of a hard casting product receives a collision load. This increases decelerating acceleration in an initial stage of collision to bring a seat belt into a restrained state quickly. The front half portion is formed of a casting product and brittle. Therefore, the strength lowering portion undergoes breaking fracture due to a subsequent input of a large collision load. As a result, decelerating acceleration temporarily decreases, a forward moving speed of an occupant decreases, and it is possible to suppress significant approach of the occupant to a vehicle body. In addition, since the strength lowering portion is disposed immediately ahead of the connecting portion connected to the rear half portion, time elapses from breaking fracture of the strength lowering portion to start of application of a collision load to the rear half portion by contact of a barrier with the rear half portion. Therefore, a period during which decelerating acceleration is small increases, and it is possible to effectively suppress approach of an occupant to a vehicle body. Furthermore, since the rear half portion has a sheet metal structure capable of large elongation deformation, the rear half portion remains without being crushed when the front half portion undergoes breaking fracture, receives a collision load after the front half portion undergoes breaking fracture, and can absorb the collision load due to bending deformation. This can effectively suppress invasion of a barrier even in a case where the collision load is large.

In the apron upper member of a vehicle according to an embodiment of the present disclosure, the rear half portion may have a closed cross section structure, and the front half portion may have the connecting portion, the strength lowering portion, and a general portion other than the connecting portion and the strength lowering portion. Each of the general portion and the connecting portion may be a groove-shaped cross section and include a web, a flange erected from both ends of the web, and a reinforcing rib disposed on a surface of the web. The strength lowering portion may have a configuration in which the reinforcing rib is not disposed on a surface of the web and the web or the flange is curved in a direction in which the outer size of the groove-shaped cross section becomes smaller.

In this manner, by forming the front half portion into a groove-shaped cross-sectional shape having a rib disposed therein to secure strength and forming the strength lowering portion into a structure in which the rib is not disposed and the web or the flange is curved, the front half portion can be formed of a casting product. In addition, by forming the rear half portion into a closed cross section structure, it is possible to secure such strength that the rear half portion remains without being crushed when the front half portion undergoes breaking fracture, and to effectively receive a collision load after the front half portion undergoes breaking fracture to suppress invasion of a barrier.

In the apron upper member of a vehicle according to an embodiment of the present disclosure, decelerating acceleration at which an occupant restraint device is activated may be generated before the crash box starts to undergo compressive plastic deformation.

As a result, a seat belt can be brought into a restrained state while the crash box undergoes compressive plastic deformation in an initial stage of collision, and it is possible to suppress significant approach of an occupant to a vehicle body.

Advantageous Effects of the Invention

The present disclosure can suppress approach of an occupant to a vehicle body at the time of collision.

BRIEF DESCRIPTION OF THE DRAWINGS

Embodiment(s) of the present disclosure will be described based on the following figures, wherein:

FIG. 3A is an elevation view of the apron upper member illustrated in FIG. 2 as viewed from the inside of the vehicle;

FIG. 3B is a plan view of a portion B as viewed from above the vehicle;

DESCRIPTION OF EMBODIMENTS

Figure 1:
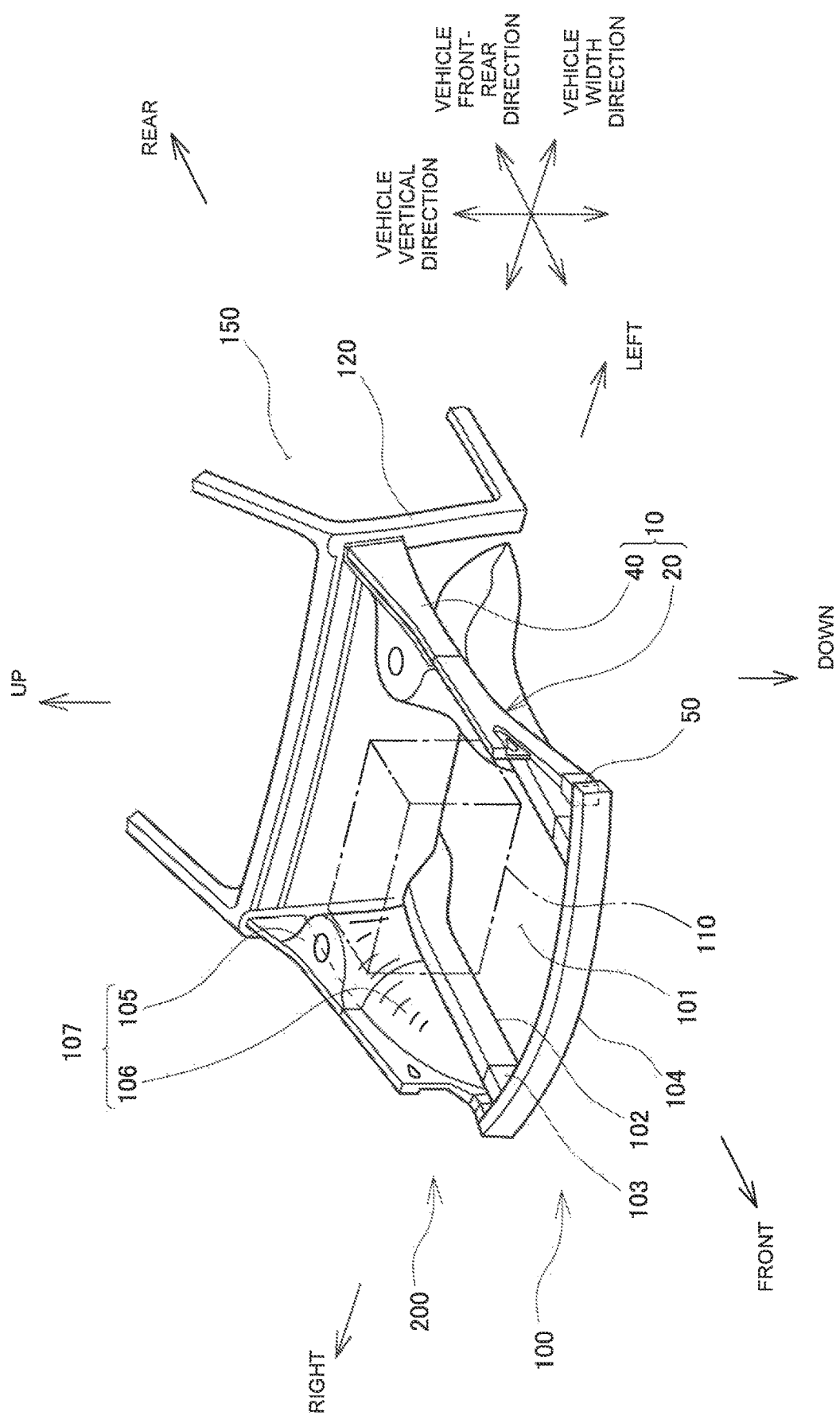
FIG. 1 is a perspective view illustrating a front structure of a vehicle incorporating an apron upper member according to an embodiment.

Hereinafter, an apron upper member 10 of a vehicle 100 according to the present embodiment will be described with reference to the drawings. First, with reference to FIG. 1, a front structure 200 of the vehicle 100 incorporating the apron upper member 10 according to the embodiment will be described.

An engine compartment 101 on which a power unit 110 such as an engine or a motor is mounted is disposed on a front side of a vehicle compartment 150 of the vehicle 100. On both sides of a lower portion of the engine compartment 101 in a vehicle width direction, front side members 102 which are structural members extending in a vehicle front-rear direction are disposed. A front end of the front side member 102 is connected to a front cross member 104 via a crash box 103.

On both sides of the front side member 102 in a vehicle width direction, aprons 107 each formed integrally with a wheel housing 106 and a suspension tower 105 are disposed. On an upper side of the wheel housing 106 in a vehicle width direction of the suspension tower 105, the apron upper member 10 having a rear end joined to a front pillar 120 and extending to a front side of the vehicle to reinforce each of the aprons 107 is disposed. A front end of the apron upper member 10 is connected to the front cross member 104 via a crash box 50.

Figure 2:
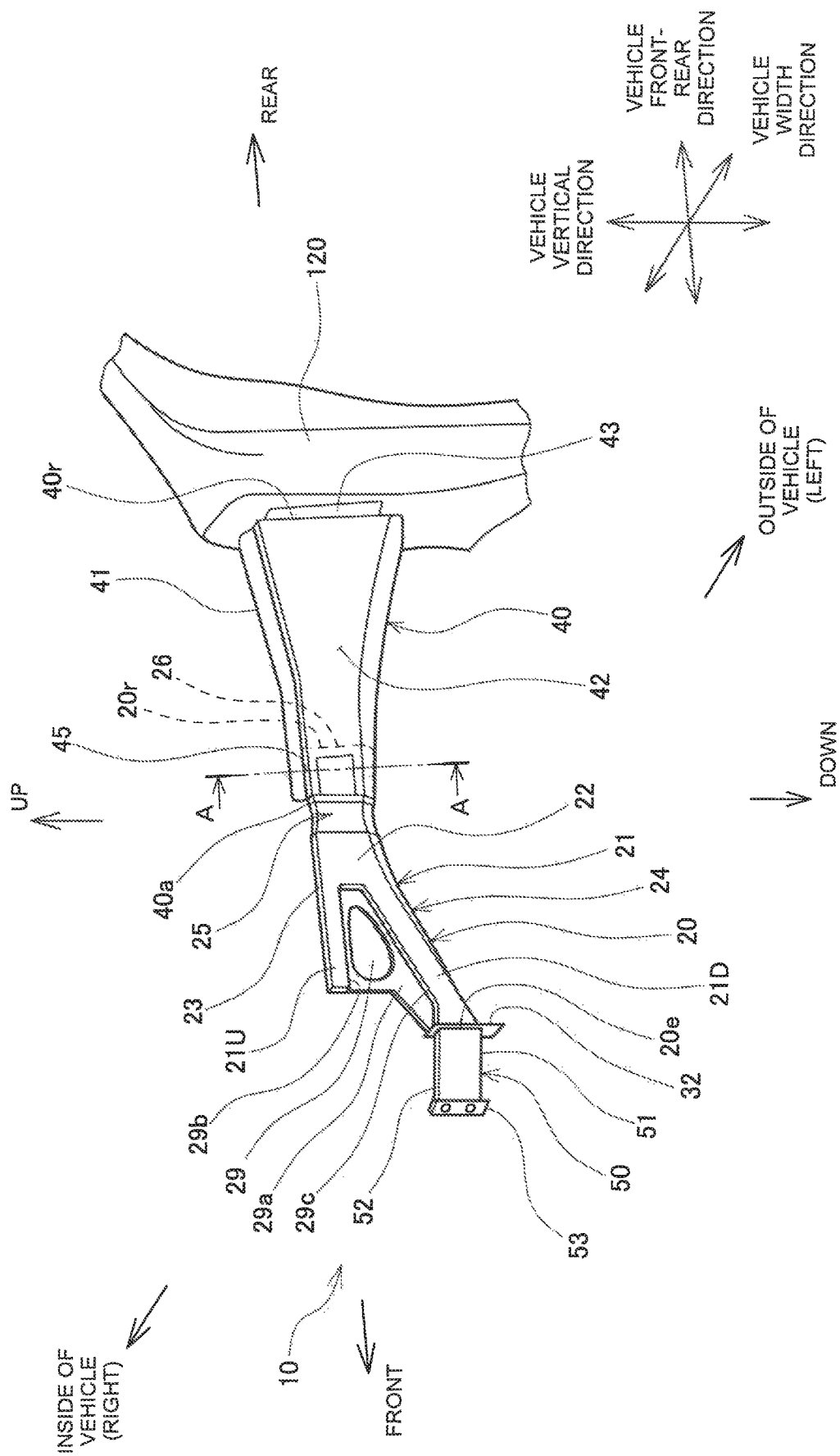
FIG. 2 is an enlarged perspective view of the apron upper member according to the embodiment as viewed from the outside of the vehicle.

As illustrated in FIG. 2, the apron upper member 10 includes: a rear half portion 40 having a sheet metal structure and having a connecting flange 43 of a vehicle rear end 40r welded and connected to the front pillar 120; and a front half portion 20 formed of a casting product such as an aluminum die casting product, the front half portion 20 being connected to the rear half portion 40, extending to the front side of the vehicle, and being connected to the crash box 50 which undergoes compressive plastic deformation in a vehicle front-rear direction at the time of front collision of the vehicle 100.

Figure 4:
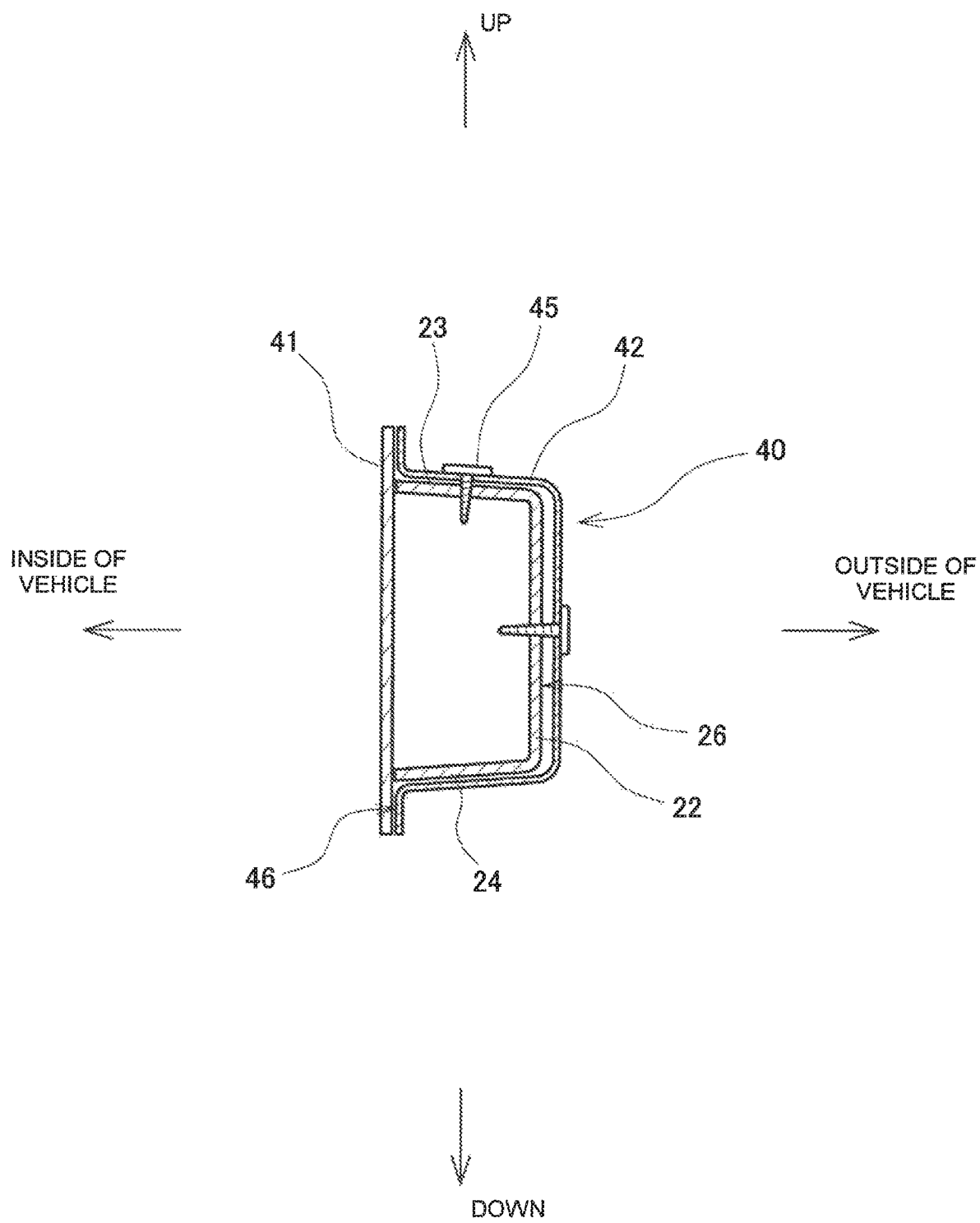
FIG. 4 is a cross-sectional view taken along line A-A illustrated in FIG. 2.

FIG. 2 is an enlarged perspective view of the apron upper member 10 as viewed from the outside of the vehicle. FIG. 3A is an elevation view of the apron upper member 10 as viewed from the inside of the vehicle on the opposite side to FIG. 2. As illustrated in FIGS. 2 and 3A, the front half portion 20 includes a general portion 21, a strength lowering portion 25 having lower strength than the general portion 21, and a connecting portion 26 connected to the rear half portion 40. The general portion 21 is a groove-shaped cross section including a plate-shaped web 22, an upper flange 23 erected from an upper end of the web 22 in a vehicle vertical direction toward the inside of the vehicle, and a lower flange 24 erected from a lower end of the web 22 toward the inside in a vehicle width direction. That is, the flanges 23 and 24 each extend from both ends of the web 22 in a vehicle vertical direction toward the inside in a vehicle width direction. As illustrated in FIG. 4, the connecting portion 26 is a groove-shaped cross section including the web 22, the upper flange 23, and the lower flange 24 similarly to the general portion 21. The strength lowering portion 25 is a portion between the general portion 21 and the connecting portion 26.

As illustrated in FIGS. 2 and 3A, a vehicle front side of the general portion 21 is divided into an upper arm 21U extending straight toward the front side of the vehicle and a lower arm 21D extending obliquely downward in the front side of the vehicle along the wheel housing 106 illustrated in FIG. 1. A flat plate-shaped recess 29a is formed between the upper arm 21U and the lower arm 21D. The recess 29a includes a hole 29 for weight reduction. In addition, a vertical wall 29b erected between the recess 29a and the web 22 is disposed. Similarly, a vertical wall 29c erected between the web 22 of the lower arm 21D and the recess 29a is disposed. A plate 32 to which the crash box 50 is connected is attached to a tip of the lower arm 21D (a vehicle front end 20e of the front half portion 20).

The crash box 50 is connected to the vehicle front side of the plate 32. The crash box 50 is connected to the front cross member 104 illustrated in FIG. 1 via a plate 53. The crash box 50 is a box-shaped member in which beads 52 extending in a vehicle width direction are formed in one or two stages in a vehicle front-rear direction. Each of the beads 52 is, for example, a V-shaped groove and serves as a starting point of compressive plastic deformation. In the present embodiment, the crash box 50 has the small number of beads 52 serving as starting points of compressive plastic deformation, and therefore can receive a large collision load F before the crash box 50 starts to undergo compressive plastic deformation, and generates decelerating acceleration at which a seat belt serving as an occupant restraint device is activated during this period of time.

As illustrated in FIG. 3A, on an inner surface of the web 22 of the general portion 21 in a vehicle width direction, a vertical rib 27 and reinforcing ribs 30 and 31 are disposed. In addition, on an inner surface of the web 22 of the connecting portion 26 in a vehicle width direction, a vertical rib 28 is disposed. The vertical rib 27 partitions the general portion 21 from the strength lowering portion 25, and the vertical rib 28 partitions the strength lowering portion 25 from the connecting portion 26. The reinforcing rib 30 connects the plate 32 disposed at the vehicle front end 20e to the vertical rib 27 in parallel to the lower flange 24. The reinforcing rib 31 forms a truss structure between the reinforcing rib 30 and the lower flange 24. Therefore, the lower arm 21D is a groove-shaped cross section constituted by the reinforcing rib 30, the lower flange 24, and the web 22. The plate 32 is connected to the vertical rib 27 with a truss constituted by the lower flange 24 and the reinforcing ribs 30 and 31.

As illustrated in FIGS. 3A and 3B, the strength lowering portion 25 is a groove-shaped cross section constituted by a web 25a, an upper flange 25b, and a lower flange 25c. As illustrated in FIG. 3A, the reinforcing ribs 30 and 31 are not disposed on an inner surface of the web 25a in a vehicle width direction. As illustrated in FIG. 3A, the upper flange 25b is curved so as to protrude downward, and the lower flange 25c is curved so as to protrude upward. As illustrated in FIG. 3B, the web 25a is curved toward the inside of the vehicle, the direction being a direction in which the flanges 25b and 25c extend. In this manner, the web 25a and the flanges 25b and 25c are curved in such a direction that the outer size of the groove-shaped cross section of the strength lowering portion 25 becomes smaller.

As described above, the general portion 21, the strength lowering portion 25, and the connecting portion 26 of the front half portion 20 are each a groove-shaped cross section constituted by the webs 22 and 25a and the upper and lower flanges 23, 24, 25b, and 25c. The general portion 21 and the connecting portion 26 each have reinforcing ribs 30 and 31 disposed on a surface of the web 22 in order to secure strength. The strength lowering portion 25 is formed by curving the web 25a and the flanges 25b and 25c without having the reinforcing ribs 30 and 31 disposed thereon. Therefore, the front half portion 20 can be easily manufactured by casting such as aluminum die casting.

As illustrated in FIG. 4, the rear half portion 40 has a quadrangular closed cross section structure obtained by welding a flat plate-shaped inner panel 41 to a hat-shaped outer panel 42 by spot welding 46. The inner diameter size of the closed cross section of the rear half portion 40 is substantially the same as the outer size of the connecting portion 26 of the front half portion 20. The connecting portion 26 is fitted tightly into the closed cross section of the rear half portion 40 from a vehicle rear end 20r. The rear half portion 40 and the connecting portion 26 are fixed by friction screw welding (FSW) for screwing a friction screw 45 for welding and fixing. As illustrated in FIG. 2, the strength lowering portion 25 of the front half portion 20 is disposed immediately ahead of the connecting portion 26 connected to the rear half portion 40.

Figure 6:
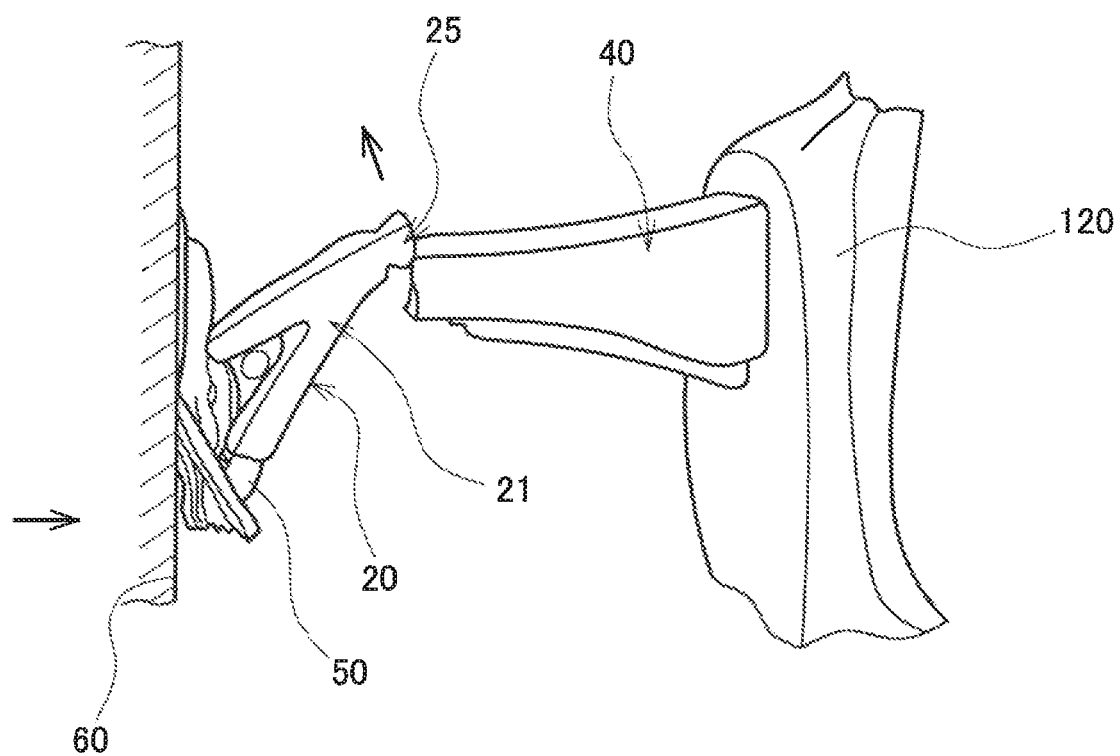
FIG. 6 is a perspective view illustrating deformation of the apron upper member at time t1 illustrated in FIG. 5.
Figure 7:
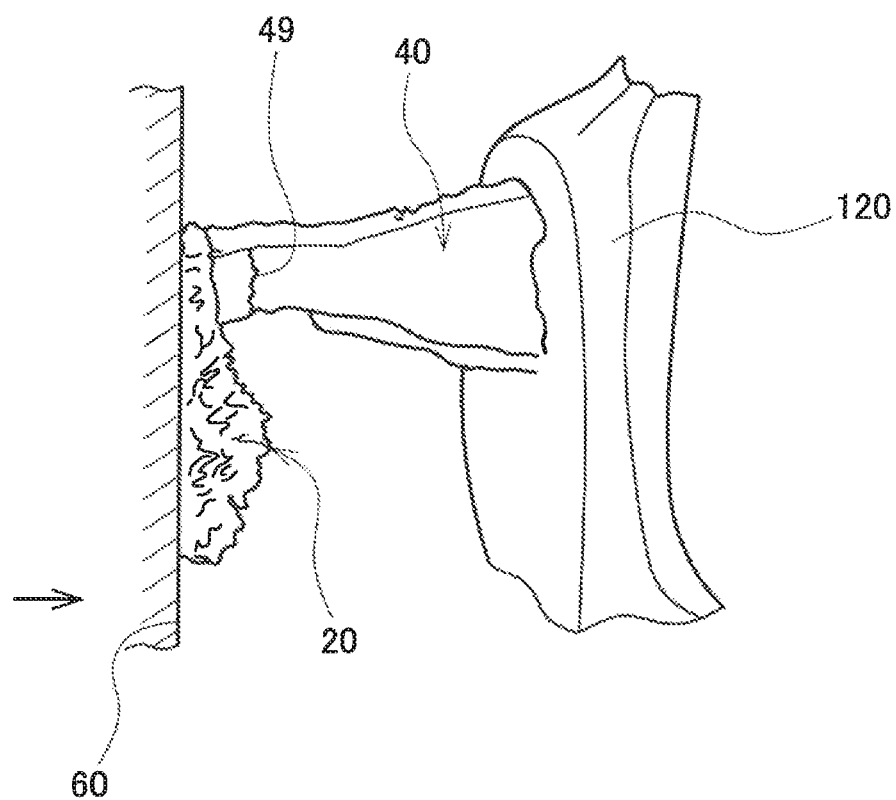
FIG. 7 is a perspective view illustrating deformation of the apron upper member at time t3 illustrated in FIG. 5.

Next, with reference to FIGS. 5 to 7, a change with time in collision load F and deformation of the apron upper member 10 when the vehicle 100 incorporating the apron upper member 10 according to the embodiment causes front collision will be described. When the vehicle 100 collides with a barrier 60 illustrated in FIG. 6 at time t0 illustrated in FIG. 5, a collision load F is input from the front cross member 104 to the crash box 50 connected to the vehicle front end 20e of the front half portion 20. The crash box 50 has the small number of beads 52 serving as starting points of compressive plastic deformation, and therefore transmits the large collision load F to the apron upper member 10 before the crash box 50 starts to undergo compressive plastic deformation.

The lower arm 21D of the front half portion 20 of the apron upper member 10 and the rear half portion 40 transmit the received large collision load F to the front pillar 120. As a result, decelerating acceleration at which restraint of a seat belt is activated is generated in the vehicle 100, an occupant is restrained by the seat belt in an initial stage of collision immediately after time t0 illustrated in FIG. 5, and approach of the occupant to the front side of a vehicle body is suppressed.

Figure 5:
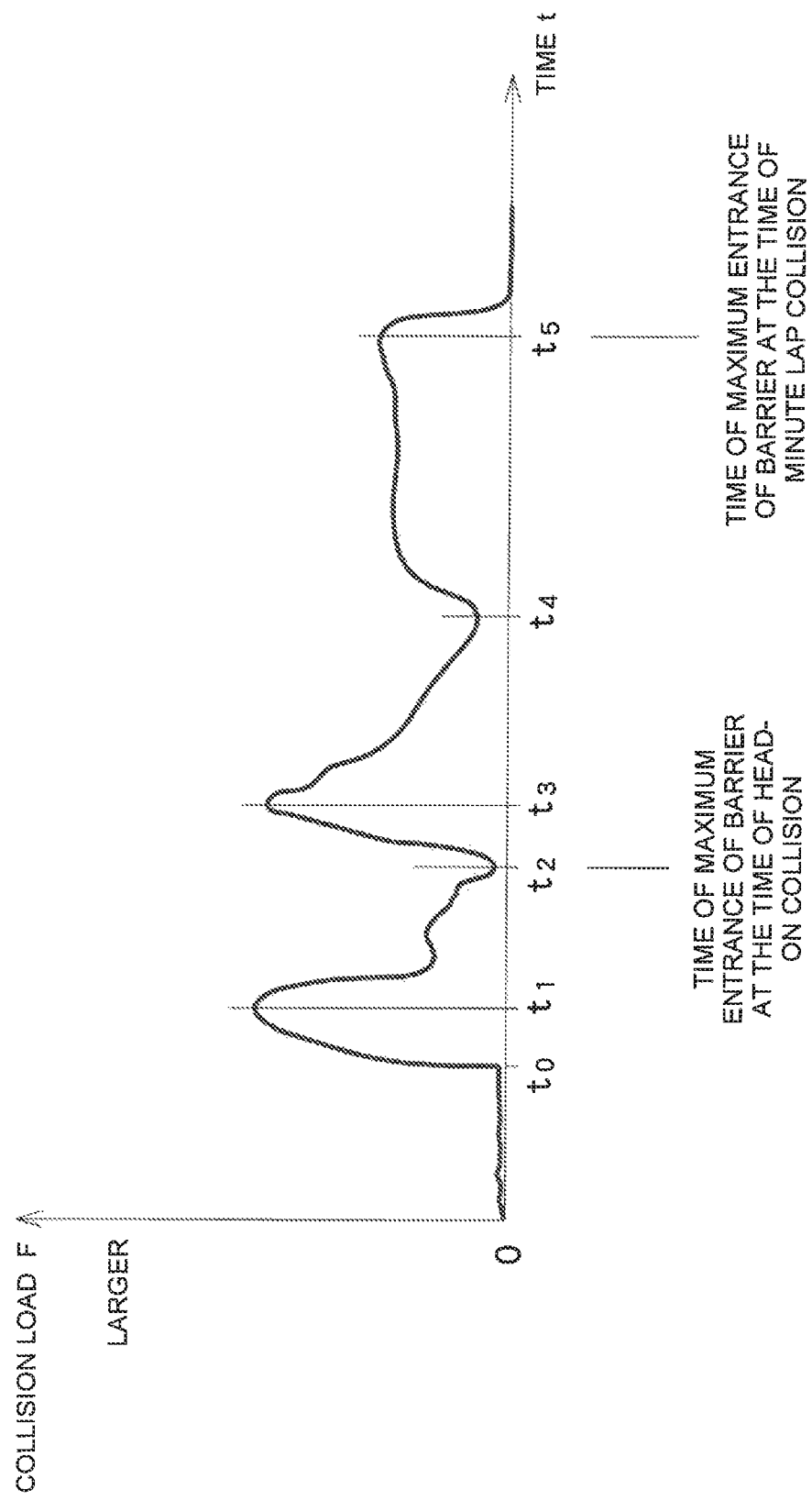
FIG. 5 is a diagram illustrating a change with time in collision load when a vehicle incorporating the apron upper member according to the embodiment collides.

When the collision load F increases from time t0 to t1 in FIG. 5, the crash box 50 starts to undergo compressive plastic deformation and starts to be crushed. When the crash box 50 is crushed, the collision load F input to the apron upper member 10 becomes larger. This large collision load F concentrates on the strength lowering portion 25 of the front half portion 20 of the apron upper member 10. Since the front half portion 20 is formed of a brittle casting product such as an aluminum die casting product, the flanges 25b and 25c or the web 25a of the strength lowering portion 25 on which the collision load F concentrates fractures. At time t1 illustrated in FIG. 5, as illustrated in FIG. 6, the strength lowering portion 25 fractures so as to jump up in a vehicle upper direction. Since the rear half portion 40 has a sheet metal structure of a steel plate capable of large elongation deformation, the rear half portion 40 remains without being crushed when the front half portion 20 undergoes breaking fracture.

As illustrated in FIG. 5, when the strength lowering portion 25 of the front half portion 20 undergoes breaking fracture at time t1, the collision load F received by the apron upper member 10 rapidly decreases toward time t2 illustrated in FIG. 5. During this period of time, the collision load F transmitted from the apron upper member 10 to the front pillar 120 also rapidly decreases. Therefore, decelerating acceleration of the vehicle 100 rapidly decreases, and an occupant hardly approaches a front side of a vehicle body. In addition, since the strength lowering portion 25 is disposed immediately ahead of the connecting portion 26 connected to the rear half portion 40, time elapses from breaking fracture of the strength lowering portion 25 to start of application of the collision load F to the rear half portion 40 by contact of the barrier 60 with the rear half portion 40.

Therefore, a period during which decelerating acceleration is small increases, and it is possible to effectively suppress approach of an occupant to a vehicle body.

Since the rear half portion 40 has a sheet metal structure of a steel plate capable of large elongation deformation, the rear half portion 40 remains without being crushed when the front half portion 20 undergoes breaking fracture, and can receive the collision load F even after the strength lowering portion 25 of the front half portion 20 undergoes breaking fracture. Then, when time t2 elapses, the collision load F starts to be applied to a vehicle front end 40e of the rear half portion 40, and the collision load F starts to increase again. Then, at time t3 in FIG. 5, as illustrated in FIG. 7, the rear half portion 40 starts to undergo bending deformation, and the collision load F starts to decrease. The rear half portion 40 has a closed cross section structure of a steel plate, is largely elongated and deformed, and does not undergo breaking fracture unlike the front half portion 20 formed of a casting product. Therefore, after time t1 the collision load F decreases more gradually than the collision load F. During this period of time, the rear half portion 40 absorbs the collision load F by bending deformation.

Then, at time t4, bending deformation of the rear half portion 40 ends and the entire rear half portion 40 is compressed. At this time, a certain degree of the collision load F is transmitted to the front pillar 120. When collision ends at time t5 and entry of the barrier 60 stops, the collision load F becomes zero.

Among cases of front collision of the vehicle 100, in a case of head-on collision in which the barrier 60 enters the front of the vehicle 100, the left and right apron upper members 10 receive the collision load F. However, in a case of minute lap collision in which the barrier 60 enters only a side portion of the front of the vehicle 100, only the apron upper member 10 on a side which the barrier 60 enters receives the collision load F. Therefore, larger collision energy is input to the apron upper member 10 in the case of minute lap collision than in the case of head-on collision.

At the time of head-on collision, the front half portion 20 undergoes breaking fracture, and the apron upper member 10 thereby absorbs collision energy thereof. Therefore, entry of the barrier 60 stops around time t2 illustrated in FIG. 5 after the front half portion 20 undergoes breaking fracture before the collision load F starts to be applied to the rear half portion 40. That is, the barrier 60 stops around the vehicle front end 40e of the rear half portion 40. At the time of minute lap collision, breaking fracture of the front half portion 20 and bending fracture of the rear half portion 40 receive collision energy. Therefore, entry of the barrier 60 stops around time t5 illustrated in FIG. 5 after the rear half portion 40 undergoes bending fracture. At this time, the barrier 60 stops in front of the front pillar 120.

Therefore, since the barrier 60 stops in front of the rear half portion 40 at the time of head-on collision, the apron upper member 10 according to the present embodiment can absorb collision energy, because the front half portion 20 is sufficiently crushed such that there is no uncrushed portion left in the front half portion 20 at the time of head-on collision. At the time of minute lap collision, since the front half portion 20 and the rear half portion 40 sufficiently absorb collision energy, it is possible to stop entry of the barrier 60 in front of the front pillar 120.

As described above, the apron upper member 10 according to the present embodiment receives the collision load F in the hard crash box 50 and the front half portion 20 formed of a hard casting product, thereby increases decelerating acceleration in an initial stage of collision to bring a seat belt into a restrained state quickly, and then causes breaking fracture in the strength lowering portion 25 of the front half portion 20 to temporarily decrease the decelerating acceleration such that an occupant does not significantly approach a vehicle body. Thereafter, the rear half portion 40 remaining without being crushed absorbs the collision load F. This makes it possible to suppress significant approach of an occupant to a vehicle body at the time of collision.

Incidentally, it has been described that the strength lowering portion 25 is configured by curving the web 25a and the flanges 25b and 25c without disposing the reinforcing ribs 30 and 31. However, the strength lowering portion 25 is not limited to this configuration, and may have a hole therein or may have a large thickness.

The invention claimed is:

1. An apron upper member of a vehicle extending from a front pillar to a front side of the vehicle, comprising:
   a rear half portion having a sheet metal structure and having a vehicle rear end connected to the front pillar; and
   a front half portion formed of a casting product, the front half portion being connected to the rear half portion, extending to the front side of the vehicle, and having a vehicle front end connected to a crash box which undergoes compressive plastic deformation in a vehicle front-rear direction at the time of front collision of the vehicle, wherein
   the front half portion has a strength lowering portion immediately ahead of a connecting portion connected to the rear half portion.

2. The apron upper member of a vehicle according to claim 1, wherein
   the rear half portion has a closed cross section structure,
   the front half portion has the connecting portion, the strength lowering portion, and a general portion other than the connecting portion and the strength lowering portion,
   each of the general portion and the connecting portion is a groove-shaped cross section and includes a web, a flange erected from both ends of the web, and a reinforcing rib disposed on a surface of the web, and
   in the strength lowering portion, the reinforcing rib is not disposed on a surface of the web, and the web or the flange is curved in a direction in which an outer size of the groove-shaped cross section becomes smaller.

3. The apron upper member of a vehicle according to claim 1, wherein
   decelerating acceleration at which an occupant restraint device is activated is generated before the crash box starts to undergo compressive plastic deformation.

4. The apron upper member of a vehicle according to claim 2, wherein
   decelerating acceleration at which an occupant restraint device is activated is generated before the crash box starts to undergo compressive plastic deformation.

* * * * *